April 23, 1935.  L. B. GREEN  1,999,007
GRILLE FOR AUTOMOBILE FRONTS
Filed May 29, 1933    2 Sheets-Sheet 1

Inventor:
Lee B. Green
by Albert Scheible
Attorney

April 23, 1935.　　　　L. B. GREEN　　　　1,999,007
GRILLE FOR AUTOMOBILE FRONTS
Filed May 29, 1933　　　　2 Sheets-Sheet 2
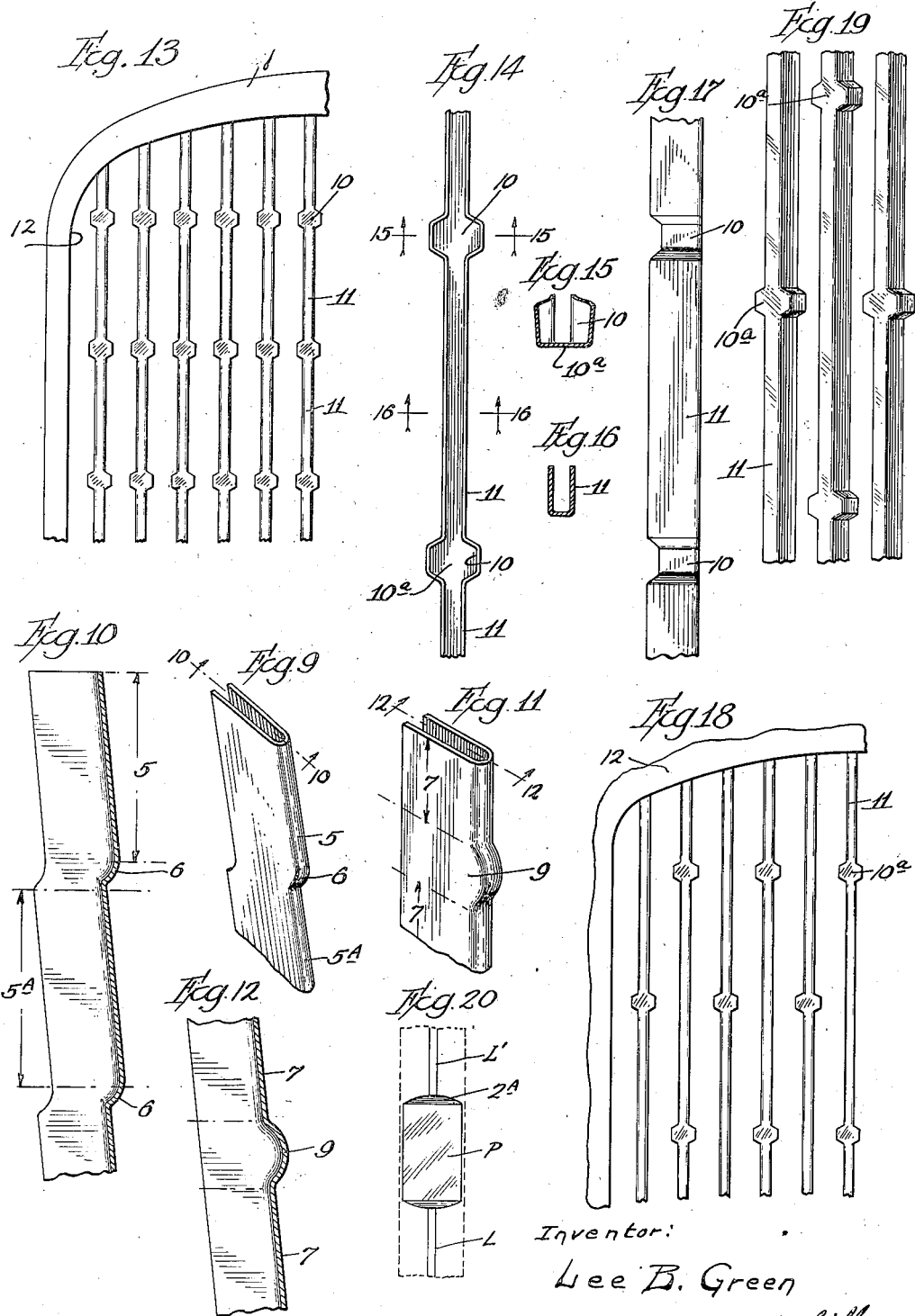

Patented Apr. 23, 1935

1,999,007

UNITED STATES PATENT OFFICE 1,999,007

GRILLE FOR AUTOMOBILE FRONTS

Lee B. Green, Lakewood, Ohio, assignor to Globe Machine & Stamping Company, Cleveland, Ohio, a corporation of Ohio Application May 29, 1933, Serial No. 673,463

9 Claims. (Cl. 293—54)

My invention relates to grilles having parallel louver blades, and in its general objects aims to provide grilles of this class in which cheaply manufactured deformations of relatively short portions of the louver blades will enhance the appearance of the grille, and also will greatly increase the extent to which these louver blades obscure a view of what is behind the grille.

In a passenger automobile, the frontal opening of the radiator shell is usually spanned by a grille. In most of the modern cars, a grille with parallel blades of rearwardly open U-section is preferred, because the parallel blades when viewed from many angles obscure more of the view of the radiator core behind the grille than a woven wire or screen type grille, and also because a parallel blade grille is stronger as a guard for preventing stones or the like from impacting against the radiator core.

However, such parallel louver blades need to be consecutively spaced by distances considerably greater than the width of each blade, in order that the total of the air-admitting passages between the blades will be a major fraction of the area of the said opening, and also to keep down the cost of the grille. As the result of this spacing, portions of the radiator core are still readily seen through the grille, both in a squarely frontal view of the grille and in views at angles of less than about 40 degrees to a vertical plane at right angles to the front face of the said core. Moreover, such a parallel-blade grille necessarily has a plain straight-lined "prison bar" appearance which detracts from the generally ornamental effect imparted to the car front by an artistic shaping of the radiator shell and parts adjacent to the latter.

My present invention aims to overcome both of the just recited short-comings without materially increasing the cost of the grille, or materially reducing the total area of the air-admitting passages between the blades of the grille, or increasing the number of blades in the grille or the general width of each blade.

With a parallel-blade automobile radiator grille, the visibility of the radiator core behind this grille necessarily depends partly on the extent to which this core is reached by light entering between the blades of the grille, and this visibility depends also on the extent to which light is reflected from the forward edges of the blades directly to the eyes of the observer. When the blades are of a rearwardly open U-section, which section is commonly employed for securing rigidity in blades formed of thin metal, light is reflected toward a viewer in front of the car only from a part of the front of the blade; and this effective frontal reflecting portion of the blade is of uniform width throughout the length of the blade. And, since the blade front is constituted by its forwardly convexed U-back, this reflection of light also is only from a narrow strip portion of the blade front. Consequently, even if the blade is brightly chrome-plated, the light directly reflected forwardly from the grille consists of parallel and flat beams, each of which beams is so narrow in proportion to the spacing between consecutive beams that the total reflection of light has only a rather limited effect towards obscuring a view of the radiator core through the grille. And if the blade is black (as for example, merely japanned) the reduced reflection of light from a black surface cooperates with the blackness of the major frontal edge portion of the blade (from which light is not reflected to the eye of the observer) to merge into the color of the radiator core, thereby making this core still more clearly visible. Moreover, the presentation of these narrow and parallel light-reflecting frontal portions enhances the parallel-bar effect of the grille and detracts from the ornamental effect produced by the design of other frontal portions of the car.

However, I have discovered that if longitudinally spaced portions of the forward edge of a louver blade are formed so that these portions will reflect light forwardly in an enhanced or otherwise materially differing manner from the line-like or strip-like refection of light by the remainder of this forward blade edge, the eye of the observer is strongly impressed by this difference in the reflection of the light; and when these deformed portions on the several blades of the grille are disposed along lines, they cooperate in forming a pattern which catches the eye of the observer still more, thereby materially deterring him from observing what is behind the grille.

In utilizing the just recited observations I have also found that such an enhanced concealment of what is behind the grille can be obtained by blade deformations which operate in several different ways; as for example, by reflecting spaced beams of light of much greater width than the narrow beams reflected by the undeformed blade portions; by reflecting light in forwardly diverging rays, or by reflecting light away from the eyes of the observer to produce a shadow effect.

Since my invention is particularly applicable to automobile radiator grilles, I am herewith illustrating my invention in corresponding embodiments, although I do not wish to be limited either as to the illustrated cross-sectional shapes of the grille blades or as to the purposes for which my concealment-enhancing grille is employed.

In the drawings,

Fig. 9 is an enlarged and fragmentary perspective view of a louver blade showing how one of the said offsetting portions operates according to my invention by producing a shadow-like effect.

Fig. 10 is a section taken along the line 10—10 through a longer part of the blade of Fig. 9.

Fig. 11 is a fragmentary perspective view of a louver blade in which a portion of the channel-back of the blade is deformed by forwardly embossing it, so as to operate according to my invention by producing a combined high-light and shadow effect.

Fig. 12 is an enlarged section, taken along the line 12—12 of Fig. 11.

Fig. 13 is a fragmentary elevation of a radiator shell and grille combination, in which each U-sectioned upright louver blade has widened and flat-faced portions spaced longitudinally of the blade, whereby these wider portions in the channel-back of the blade function according to my invention, these widened portions in the several blades being disposed in horizontal lines.

Fig. 14 is an enlarged rear elevation of a part of one of the louver blades of Fig. 13.

Figs. 15 and 16 are sections taken respectively along the lines 15—15 and 16—16 of Fig. 14.

Fig. 17 is a side elevation of a part of a blade of Fig. 13 or 14, drawn on the same scale as Fig. 14.

Fig. 18 is a fragmentary elevation allied to Fig. 13, but with the widened blade portions of consecutive blades in relatively staggered arrangement.

Fig. 19 is an enlarged perspective view of adjacent parts of three consecutive louver blades in Fig. 18.

Figure 2:
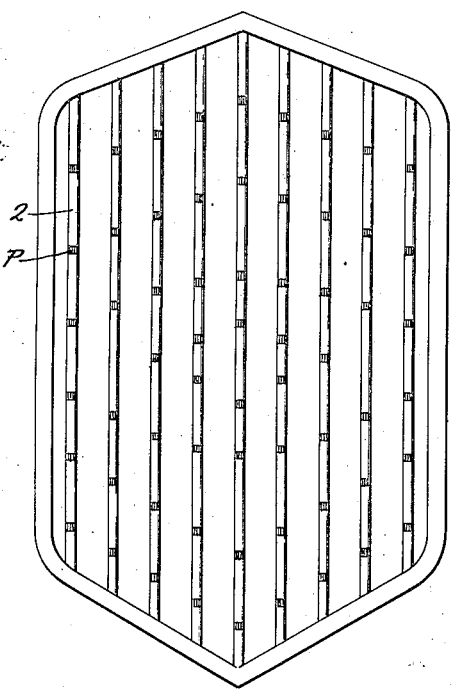
Fig. 2 is an elevation of an automobile radiator shell of hexagonal contour, and of a grille in which the deformed blade portions form lines harmonizing with that contour.
Figure 3:
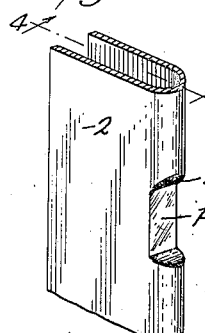
Fig. 3 is an enlarged perspective view of a part of one of the louver blades of Fig. 1 or Fig. 2.

Fig. 20 is a diagrammatic view showing the reflection of light toward a frontal observer from a blade part which includes a portion deformed as in Figs. 2 and 3.

Figure 1:
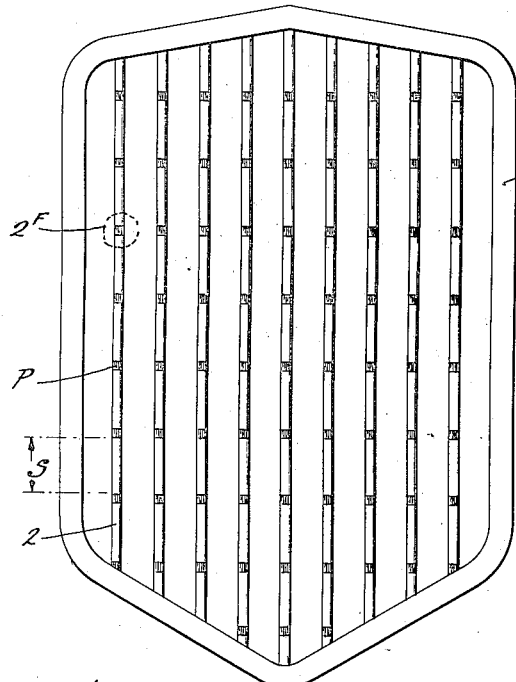
Fig. 1 is a front elevation of an automobile radiator shell fitted with a grille comprising upright grille blades of rearwardly open U-section and having spaced portions of these blades indented rearwardly to function according to my invention, these deformed portions in the numerous blades of the grille being disposed in horizontal lines.
Figure 5:
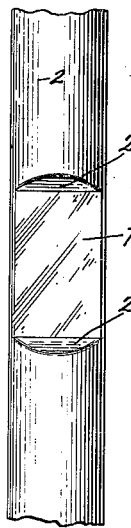
Fig. 5 is an enlarged front elevation of a part of the same louver blade.
Figure 8:
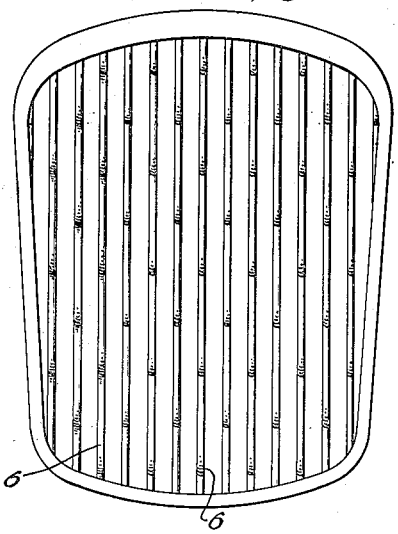
Fig. 8 is an elevation of a radiator shell and grille assembly allied in which each louver blade is deformed to offset longitudinally consecutive blade portions from each other, thereby affording spaced shadows, and in which the offsets in consecutive louver blades are in relatively staggered disposition.

In the drawings, Fig. 1 somewhat diagrammatically shows a conventional radiator shell front 1 having its opening 12 spanned by upright (and hence parallel) louver blades 2 of rearwardly open channel-section. This cross-section of each blade is uniformly of the shape of a simple U as shown by the upper portions of Figs. 3 and 5 in the spaced major portions of the blade, but each blade also includes relatively short secondary portions P differing in cross-section from the said general U-section, as for example by having the (forwardly facing) channel-back of the blade flattened as more clearly shown in Figs. 3 and 5. These flat-fronted secondary portions P are desirably of uniform length, and in Fig. 1 the portions P are consecutively spaced longitudinally of the blade by uniform spacings S, the length of each of the said portions P being a relatively small fraction of the spacing S.

Figure 4:
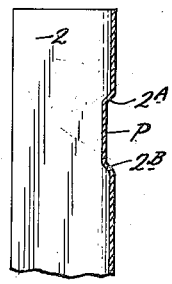
Fig. 4 is a section taken along the line 4—4 of Fig. 3.

Moreover, each flat-fronted portion P has its upper end connected to the main blade section above it by a shoulder portion 2A which slopes rearwardly downward, and has its lower end connected to the adjacent main section below it by a second shoulder portion 2B which desirably slopes rearwardly upward as shown in Fig. 4.

Such a louver blade can be cheaply manufactured from a strip of sheet steel by first shaping the strip to a uniform U-section and then indenting the U-back part of the blade in longitudinally spaced short portions of the blade. With each blade thus formed, the major portions of the blade have their forward surfaces constituting alined semi-cylindrical surfaces, from each of which forward face portions light will usually be reflected (toward an observer facing the grille) by only a small portion of the width of the semi-cylindrical blade front in the form of a quite narrow upright beam L (Fig. 20).

However, each flat-fronted portion P will reflect light from its front face in a much wider beam, namely a beam of a width approximating the effective thickness of the blade, thereby contrasting strikingly with the strip-like beam L. Moreover, with the grille lighted from the sun or the sky, the blade portions 2A and 2B which respectively connect the upper and lower ends of such a blade portion P with the adjacent semi-cylindrical frontal parts of the blade will also reflect light quite differently from the narrow alined beams L.

Consequently, each blade part 2F (Fig. 1) which includes such a rearwardly offset frontal portion will present an appearance, when brightly lighted, substantially as shown in Fig. 20; namely, that of a large bright and wide area P spaced upwardly from a relatively narrow beam portion L by a less brightly lighted portion 2B, and spaced downwardly from another narrow beam portion L' by an offsetting portion 2A which reflects so little light to the observer as to give a shadow effect contrasting with the beams reflected from the area P and with the beams L and L'.

As the result of these decided contrasts, and of the relatively dim lighting of whatever is behind the grille, each such deformed blade portion affects the observers in the same manner as a source of light disposed in his field of vision, by causing him to fix his eyes on the blade front portions which reflect light toward him to this increased extent.

This contrast in the intensity of light reflected from different parts of the grille also reduces the visual acuity of the observer by what illuminating engineers call a "glare effect," thereby reducing the visibility of what is behind the grille, even if the deformed portions P are not disposed in lines or other pattern-forming relation. And when these portions are arranged in lines transverse of the blades (as in Figs. 1 and 2), the observer is also impressed by the resulting pattern; and with the blades closer to each other than shown in these figures, as they usually are in practice, the observer will be impressed by the bright horizontal lines formed by the alined deformed portions of the several blades, so that he will be still further diverted from noticing what is behind the grille.

When the blade deformations employed for this purpose include a part 2A which slopes rearwardly downward, this part reflects light downwardly and hence appears much darker than the blade portions above and below it, thereby producing a shadow effect which contrasts with the greater intensity of the light reflected from the flat-fronted portion P so as to enhance the glare effect on the eyes of the observer.

Figure 6:
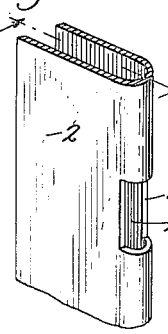
Fig. 6 is a fragmentary perspective view of a louver blade also functioning according to my invention, but in which the deformed part affords a perforation.
Figure 7:
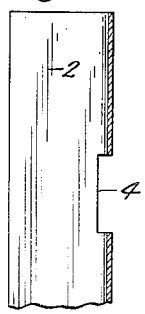
Fig. 7 is a section taken along the line 7—7 of Fig. 6.

In practice, the deforming of spaced and relatively short blade portions for thus reducing the visual acuity of a frontal observer can be varied in many ways. Indeed, even the mere forming of a slot 4 across the forward (or U-back) portion of the blade, as in Figs. 6 and 7 will accomplish this purpose in an automobile radiator front, since a frontal observer then can only see either a part of the inner face of a web of the blade (such as the part 2C in Fig. 6) through the opening afforded by such a slot 4, or a portion of the radiator core which usually is dimly lighted.

In commercial manufacture, the beneficial effects accruing from my invention can be obtained with greater manufacturing facility (in comparison with such slotting) by relatively offsetting the consecutive main sections of the blade, as shown in Fig. 9. For this purpose, I first form a sheet metal strip to a uniform U-section in which both webs of the blade present straight rear edges in a common plane throughout their length. Then I deform this channel strip to a saw-tooth formation in side elevation, so that each main section 5 of the channel blade presents its lower end further forward than the upper end of the next lower main blade section 5A (Fig. 10) and so that each two consecutive main sections are connected by a shoulder portion 6. This shoulder portion desirably curves downward rearwardly, so as to deflect light downwards, thereby producing a shadow effect which contrasts with the light reflected forwardly from the main sections adjacent to the said shoulder portion, particularly since the eyes of a frontal viewer are normally at considerably higher elevation than the grille on a car.

Or, I may leave the channel bar with straight rear edges, while merely embossing spaced portions 9 forwardly, as shown in Fig 11, so that the upper part of such a portion will also reflect light toward the observer with a "high light" effect, while the lower half of this portion will produce a shadow effect.

However, it is not essential that the deforming of louver blades for my recited purpose be such as to dispose the deformed frontal parts of the blades further forward or further rearward than the main sections of the blades. Instead, I may start with a simple channel bar of a uniform cross-section shown in Fig. 16, and thereafter widen relatively short portions 10 of the channel, in doing which I preferably form each of these short portions with a flat channel-back 10A as shown in Figs. 15 and 19.

Thus constructed, each such widened front face portion 10A will reflect a much wider beam of light than the frontal portions of the main blade sections 11 adjacent to it. This difference in the reflected beam widths can further be enhanced by forwardly convexing the frontal (or channel-back) parts of the main blade sections, as shown in Fig. 16, so that these parts will reflect beams of light of less width than the overall width of the original channel bar.

When such blades are assembled in a grille and mounted in a shell front 12, with the widened portions of the numerous blades alining transversely of the blades, as in Fig. 13, the more intense light reflected from these alined blade portions will cause the reflected beams of light to merge into each other, thereby producing the effect of wide bright strips extending horizontally across the grille.

Or, the widened portions of the blades may be disposed in other pattern-forming arrangements, as for example in the staggered arrangement shown in Figs. 18 and 19. In either case, the eyes of the observer are affected both by the relatively much greater reflection of light from the widened blade parts, and also by their pattern-forming, both of which effects detract from a viewing of what is behind the grille.

The concentrating of the vision of the viewer upon the "high-light" portions of the grille blades, or on the "shadow" portions, or on the pattern formed in the grille by either of the aforesaid portions obviously increases with the extent to which the front of the grille receives light. Consequently, I secure this radiator-core-light concealing effect in an automobile radiator grille in direct proportion to the extent to which that core is visible without the use of my deformations in the grille blades. And if a cheapening of the grille is needed for low price cars, my invention will afford this, since my here presented grille when made with a larger spacing between the blades (and hence lower cost) would still obscure a view of the radiator core.

However, while I have heretofore described my invention in embodiments in which the blades are formed of sheet metal and in which these blades are generally straight and parallel, I do not wish to be limited to these or other details of the construction and arrangement above described, since many changes might be made without departing either from the spirit of my invention or from the appended claims.

I claim as my invention:

1. As a louver element for a grille in which parallel blades are generally freely spaced from one another, a sheet metal louver blade of rearwardly open section comprising main blade having its forward portion of uniform width throughout its length and sections spaced longitudinally of the blade and each having its forward portion of a forwardly convexed section, whereby the said sections reflect light forwardly in the form of forwardly diverging beams narrower than the width of the blade; and relatively shorter blade portions interposed between consecutive main blade sections and each having its forward portion formed for reflecting light in directions differing from the aforesaid beams, whereby the contrast between the said main and shorter portions in their forward reflection of light causes the eyes of an observer to fix upon the said shorter portions to detract from his seeing what is behind the grille.

2. As a louver element for a grille in which parallel blades are generally freely spaced from one another, a sheet metal louver blade of rearwardly open section comprising a blade of uniform width throughout its length and each including a series of counterpart portions spaced from both end portions of the blade and consecutively spaced from each other by relatively longer blade sections, the cross-sectional shape of the said counterpart portions being such that the front face of each thereof reflects light forwardly in a beam of considerably different width than that of the beam of light reflected by other portions of the blade, for the purpose recited.

3. A substantially upright louver blade presenting a forward edge of saw-toothed formation when viewed in side elevation, comprising main sections each having its lower end projecting forwardly beyond the upper end of the next lower main sections, and relatively shorter frontal blade edge portions each connecting two consecutive main sections and sloping rearwardly downward; whereby each main section reflects light forwardly in the form of a narrow upright beam toward an observer in front of the grille, while each shorter portion deflects light downwardly and away from the eyes of the observer so that each such shorter portion affords a shadow effect between the beams reflected by the two main sections adjacent to that shorter portion.

4. A generally upright louver blade comprising main sections each having its front portion of the same uniform cross-section, and secondary blade portions of relatively small length in proportion to a main section, each secondary blade portion connecting the adjacent ends of two adjacent main sections and sloping rearwardly downward; whereby each main section reflects lights forwardly in the form of a flat beam, while each secondary blade portion reflects no light forwardly and hence presents a shadow effect contrasting with the beams of light reflected from the main blade sections adjacent to that secondary blade portion, for the purpose recited.

5. As a louver element for a grille in which parallel blades are generally freely spaced from one another, a sheet metal louver blade of rearwardly open section comprising main blade sections spaced longitudinally of the blade and each having its forward face of a forwardly convexed semi-cylindrical section so as to reflect light in planes diverging from the axis of the blade, whereby each such section forwardly reflects light in a beam of less width than that of the said section; and relatively shorter blade portions interposed between consecutive main blade sections and each presenting a flat frontal face of substantially the full width of the blade for forwardly reflecting a beam of light of greater width than that reflected forwardly by one of the main blade sections.

6. A louver blade as per claim 5, in which each of the shorter blade portions has both ends of its frontal portion connected to the two main blade sections between which it is interposed by rearwardly converging frontal blade parts.

7. A louver-type grille comprising substantially parallel louver elements each having its frontal portion of uniform width throughout the length of the blade, and all presenting frontal face portions approximately tangential to the general frontal surface of the grille; each louver element having the major portions of its frontal face of a substantially uniform forwardly convexed transverse section, and also having longitudinally spaced portions of its front deformed for forwardly reflecting light to an extent materially different from the reflection of light by the said portions of its frontal face, the said spaced portions of the several louver elements being in relatively staggered disposition in consecutive louver elements, the said frontally deformed portions of each louver element being freely spaced from other louver elements.

8. A louver blade as per claim 3, in which each of the said relatively shorter portions has its forward face formed as a portion of a spheroidal surface.

9. A louver type grille comprising substantially parallel louver elements each of a rearwardly open U-section and of a uniform width throughout its length and each presenting parallel U-webs; each louver element comprising major portions presenting forwardly convexed U-backs of uniform curvature, and relatively shorter minor portions interposed between consecutive major portions; each of the said minor portions having its U-back of a different frontal shape from the said convexed U-backs of the major portion, so that each shorter portion reflects light differently from the reflection of light by an equally long part of a major portion of the louver element; whereby the resulting difference in the reflection of light from the said minor and major portions causes the eyes of an observer to fix upon the said minor portions, thereby reducing the visual acuity of the observer so as to obscure his seeing what is behind the grille.

LEE B. GREEN.